US007349318B2

(12) United States Patent
Maeda et al.

(10) Patent No.: US 7,349,318 B2
(45) Date of Patent: *Mar. 25, 2008

(54) INFORMATION RECORDING METHOD, INFORMATION RECORDING MEDIUM AND INFORMATION RECORDING APPARATUS

(75) Inventors: Takeshi Maeda, Kokubunji (JP);
Hirofumi Sukeda, Tokorozawa (JP);
Hiroyuki Minemura, Kokubunji (JP);
Hidehiko Kando, Matsudo (JP);
Makoto Miyamoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 11/176,364

(22) Filed: Jul. 8, 2005

(65) Prior Publication Data

US 2005/0243680 A1 Nov. 3, 2005

Related U.S. Application Data

(63) Continuation of application No. 09/695,089, filed on Oct. 25, 2000, now Pat. No. 6,925,040, which is a continuation of application No. 09/366,641, filed on Aug. 4, 1999, now Pat. No. 6,160,784.

(30) Foreign Application Priority Data

| Aug. 4, 1998 | (JP) | .................................. 10-220097 |
| Sep. 1, 1998 | (JP) | .................................. 10-246744 |

(51) Int. Cl.
    *G11B 7/00* (2006.01)
(52) U.S. Cl. .................. 369/59.25; 369/47.1; 369/116

(58) Field of Classification Search ................ 369/100, 369/59.12, 47.1, 47.17, 47.53, 59.25, 116, 369/59.11, 47.19, 47.52, 47.51, 53.33, 13.25, 369/47.12, 47.28
See application file for complete search history.

(56) References Cited

U.S. PATENT DOCUMENTS

| 4,866,692 A | 9/1989 | Saito et al. |
| 4,873,680 A | 10/1989 | Chung et al. |
| 5,303,217 A | 4/1994 | Bakx |
| 5,347,505 A | 9/1994 | Moritsugu et al. |
| 5,418,770 A | 5/1995 | Ide et al. |
| 5,475,657 A | 12/1995 | Sato et al. |
| 5,499,227 A | 3/1996 | Higasa |
| 5,513,165 A | 4/1996 | Ide et al. |
| 5,586,099 A | 12/1996 | Finkelstein et al. |

(Continued)

FOREIGN PATENT DOCUMENTS

CN           1173941 A      2/1998

(Continued)

*Primary Examiner*—Hoa T. Nguyen
*Assistant Examiner*—Kim-Kwok Chu
(74) *Attorney, Agent, or Firm*—Antonelli, Terry, Stout & Kraus, LLP.

(57) ABSTRACT

An information recording apparatus using an optical recording medium includes a light source to irradiate a light beam to the optical recording medium and a pulse former for forming a plurality of recording pulses of the light beam. A leading edge of a first recording pulse of the recording pulses shifts at a shifting value, and the shifting value is determined by a combination of a length of M(n) of a mark being currently written and a length s(n−1) of a space precedent to the mark.

2 Claims, 6 Drawing Sheets

U.S. PATENT DOCUMENTS

| | | |
|---|---|---|
| 5,631,887 A | 5/1997 | Hurst, Jr. |
| 5,642,343 A | 6/1997 | Toda et al. |
| 5,703,855 A | 12/1997 | Kirino et al. |
| 5,732,061 A | 3/1998 | Kirino et al. |
| 5,732,062 A | 3/1998 | Yokoi et al. |
| 5,745,467 A | 4/1998 | Sakaue et al. |
| 6,226,243 B1 | 5/2001 | Kobayashi |
| 6,631,110 B1 * | 10/2003 | Seo et al. ............... 369/59.12 |
| 6,925,040 B1 * | 8/2005 | Maeda et al. .............. 369/47.1 |

FOREIGN PATENT DOCUMENTS

| | | |
|---|---|---|
| EP | 0 797 193 A1 | 9/1997 |
| EP | 0 933 759 A2 | 8/1999 |
| JP | 62-259229 | 11/1987 |
| JP | 63-48617 | 3/1988 |
| JP | 3-185629 | 8/1991 |
| JP | 8-249662 | 9/1996 |
| JP | 8-287465 | 11/1996 |
| JP | 8-387465 | 11/1996 |
| JP | 9-305971 | 11/1997 |
| WO | WO 97/30440 | 8/1997 |

\* cited by examiner

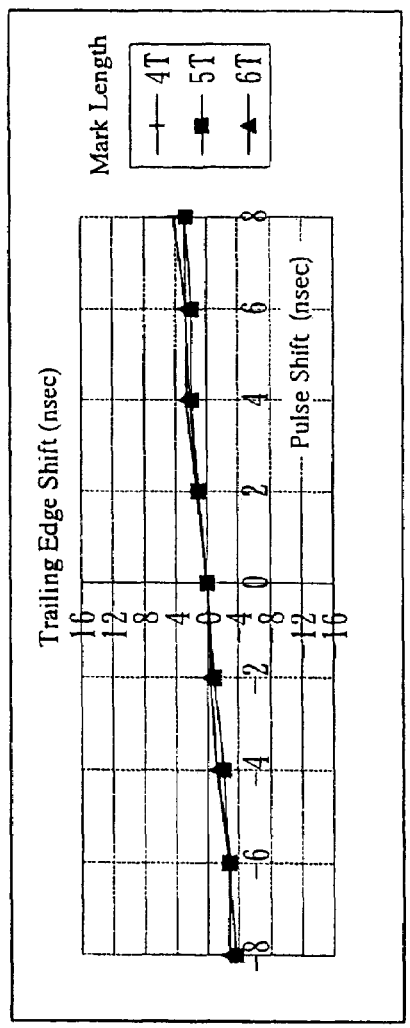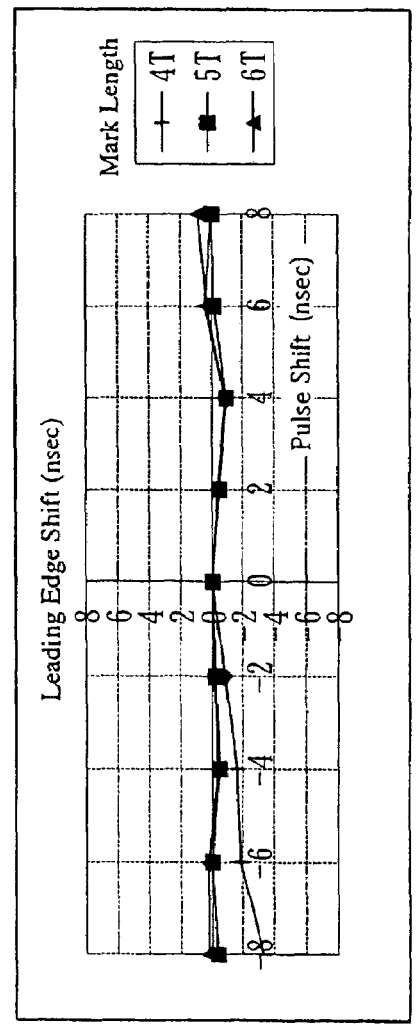

INFORMATION RECORDING METHOD, INFORMATION RECORDING MEDIUM AND INFORMATION RECORDING APPARATUS

CROSS REFERENCE TO RELATED APPLICATIONS

This is a continuation of U.S. application Ser. No. 09/695,089, filed Oct. 25, 2000, now U.S. Pat. No. 6,925,040, which is a continuation of U.S. application Ser. No. 09/366,641, filed Aug. 4, 1999, now U.S. Pat. No. 6,160,784, the subject matter of which is incorporated by reference herein, and is related to U.S. application Ser. No. 10/058,134, filed Jan. 29, 2002, now U.S. Pat. No. 6,678,225, which is a continuation of U.S. application Ser. No. 09/695,089, filed Oct. 25, 2000. This application is also related to U.S. application Ser. Nos. 11/176,313 and 11/176,388, filed concurrently herewith which are also continuations of U.S. application Ser. No. 09/695,089, filed Oct. 25, 2000.

BACKGROUND OF THE INVENTION

The present invention relates to information recording methods and apparatuses which use a medium for recording information by irradiating an energy beam and more particularly, to an information recording method and medium which can exhibit excellent effects on a phase transition optical disk as well as to an information recording apparatus based on the information recording method.

In a related art method for performing recording and erasing operations over a rewritable recording film, for example, when an optical disk is used which has an exchange coupling two-layer film as a recording film as disclosed in U.S. Pat. No. 5,475,657, or when a phase transition type optical disk recording film is used which can erase information at high speed by realizing crystallization in substantially the same time as a laser irradiation time for recording as disclosed in JP-A-62259229 (laid-open on Nov. 11, 1987); the recording and erasing are carried out by changing energy of one energy beam to one of at least two levels higher than a reading power level, that is, by changing the energy of the energy beam to one of at least a high power level and an intermediate power level. This method is advantageous in that so-called overwriting (rewriting based on overwriting) of recording new information while erasing existing information can be realized. Further, as disclosed in JP-A-62259229 and JP-A-3-185629 (laid-open on Aug. 13, 1991), such a phenomenon that a recording mark becomes a tear drop shape can be suppressed (a backward width of the recording mark becomes larger than a forward width thereof) by changing the energy of an energy beam into one of three power levels, that is, high and intermediate levels and a level lower than the intermediate level.

In recent years, there has been put in practical use a DVD-RAM (digital video disk-random access memory) which uses a 120 mm-diametered disk made of phase transition material and having a memory capacity of 2.6 GB on its one side. A recording control method employed in this example is as shown in FIG. 1 and is explained as DVD Specification for Rewritable Disc (DVD-RAM), Part 1, Physical Specifications, version 1.0 (July, 1997), Page PHX-9, FIG. F-1.

JP-A-6348617 (laid-open on Mar. 1, 1988) also discloses a method for changing an energy beam depending on a mark length (corresponding to a region length in a second state in claims at the time of its application) or on a space length (corresponding to a region length in a first state in claims at the time of its application).

Also disclosed in JP-A-8-287465 (laid-open on Nov. 1, 1996) is a method for converting an energy beam to a multi-pulsed train depending on a mark length or a space length.

SUMMARY OF THE INVENTION

Studies concerning achievement of a higher density of rewritable digital video disk (DVD-RAM) using a phase transition recording film have recently been advanced. With such an optical disk device as to perform mark edge recording over a phase transition recording film as in DVD-RAM, it is required for the purpose of avoiding mark shape distortion or missing of erasing recorded marks that an achieved temperature and a cooling rate in a record mode are substantially the same even in any outer edge of a region of a recording film melted for formation of a recording mark. However, methods proposed so far failed to satisfy the above condition sufficiently in their various recording waveforms and were limited in their achievable recording densities. Further, recording characteristics of information recording medium usually vary with medium manufacturers, manufacturing times and lots. Thus as it is desired to obtain higher density recording, it becomes more difficult to secure a recording compatibility therebetween.

In particular, in the case of a DVD-RAM having a recording capacity of 4.7 GB higher in density than a DVD-RAM having a recording capacity of 2.6 GB, when recording is carried out with the same spot diameter as in the 2.6 GB DVD-RAM, compatibility with the 2.6 GB DVD-RAM can be achieved more easily. However, as a linear density is increased with the same spot used, a spacing between positions at which two adjacent recording pulses are irradiated on the recording medium becomes smaller than the spot diameter of a laser beam on the medium. Therefore, since light distribution is overlapped when compared with the 2.6 GB case, it becomes necessary to prevent distortion of a recording mark shape caused by the overlapping. Moreover, when a space between recording marks is small, impossible separation between the marks with a reading beam spot causes a shift of a recording mark edge position of a reproduction signal waveform, it is also required to prevent such a shift. The edge position shifting way depends largely on the design of the recording medium, and the recording waveform suitable for a specific recording medium is not always suitable for another recording medium. In current circumstances, because of the increased linear density, the recording mark edge shift is increased by a mismatch between the recording medium and recording waveform to such a level as not to be negligible.

It is therefore an object of the present invention to provide a method and apparatus which can accurately record information with use of the same spot and can increase its density while attaining a compatibility. A related object of the present invention is to provide an information recording method, medium and apparatus which can stably record information on various sorts of recording media having different characteristics and also can easily secure a recording compatibility therebetween.

In order to attain the above objects, an information recording method, medium and apparatus which follow are used.

1) An information recording method wherein a single recording mark is formed on a recording medium with use of a train of a plurality of energy beam pulses, and any of a first case where a falling edge timing of a head pulse in the energy beam pulse train is substantially stationary while a rising edge timing thereof is varied and a second case where the rising and falling edge timings of the head pulse are varied, is used to record information on the basis of control data previously recorded on the recording medium.

2) An information recording apparatus which comprises an energy beam generator; a power adjustment mechanism for adjusting a power level of an energy beam generated by the energy beam generator; a holder mechanism for holding a recording medium; a movement mechanism for relatively moving the energy beam and the recording medium; a signal processing circuit for changing information to be recorded to the power level of the energy beam; first timing adjustment means for causing the power adjustment mechanism to control the energy beam generator to generate a train of a plurality of energy beam pulses from the generator, for substantially fixing a falling edge timing of a head pulse in the energy beam pulse train, and at the same time for changing a rising edge timing thereof on the basis of control data previously recorded on the recording medium at time of forming a single recording medium on the recording medium; and second timing adjustment means for changing the rising and falling edge timings of the head pulse.

3) An information recording method which includes at least one of methods 1 and 2 and uses a recording medium capable of forming a first state zone with a first power level of an energy beam and a second state zone with a second power level of the energy beam higher than the first power level, wherein the energy beam and the recording medium are relatively moved to irradiate the energy beam on the recording medium and to form the first and second state zones with predetermined lengths and with a predetermined spacing therebetween on the recording medium to record information on the recording medium, a third power level lower than the second power level is provided, and at the time of forming the second state zone having a specific length on the recording medium, a duration of the third power level is included as mixed in a duration of the second power level to convert the energy beam to a multi-pulsed train and to irradiate the energy beam on the recording medium, the method 1 substantially fixes a falling edge position of a head pulse in the multi-pulsed train and moves a rising edge position thereof at the time of forming the second state zone having a specific length, the method 2 substantially fixes a rising edge position of a tail pulse of the multi-pulsed train and moves a falling edge position thereof at the time of forming the second state zone having the specific length, a fourth power level equal to or lower than the first power level is provided, the power level of the energy beam following the tail pulse of the multi-pulsed train is kept at the fourth power level for a predetermined time and then kept at the first power level, and a time during which the fourth power level is kept is always constant regardless of the falling edge position of the tail pulse.

Since the above recording methods set forth in the above 1) and 2), information recording apparatus and corresponding information recording media are employed, the timing adjustment means always suitable for the information recording medium can be selected and information can be recorded therein always stably.

Since the above recording method of the above 3) is used, the time during which the constant fourth power level is maintained can be always realized for the information recording medium regardless of the timing adjustment. Therefore, since thermal conditions always optimum for the information recording medium can be maintained, information can be recorded in the medium always stably.

Explanation will be made as to methods, apparatuses and recording media for recording information always stably in connection with embodiments which follow.

BRIEF DESCRIPTION OF THE DRAWINGS

FIGS. 3A and 3B show experimental results in a case 2 in the recording strategy to which the present invention is applied;

DESCRIPTION OF THE EMBODIMENTS

Figure 1:
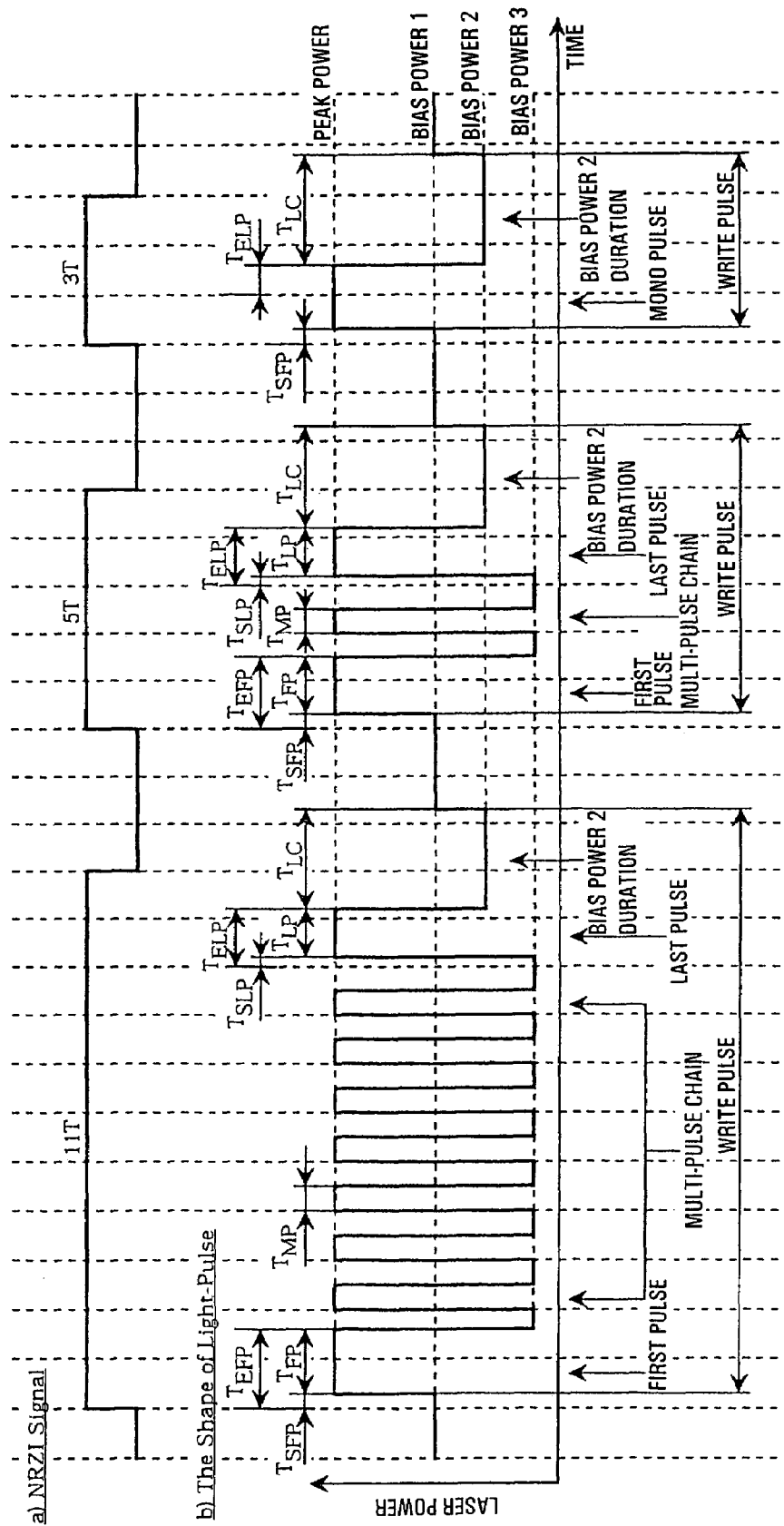
FIG. 1 shows how to record information in a recording strategy to which the present invention is applied.

Explanation will be first be made as to reference numerals used herein.

Reference numeral 100 denotes a recording medium, 108 a casing, 110 a motor, 111 a rotary shaft, 112 a chucking mechanism, 115 a rail, 116 a rail guide, 117 a case, 118 a rotating motor, 119 a linear gear, 120 a rotary gear, 121 a magnet, 122 a coil, 123 a suspension, 130 an objective lens, 131 semiconductor laser, 132 a collimating lens, 133 a beam splitter, 134 a detection lens, 135 a photodetector, 140 a detector, 141 a detection switch, 150 a system controller, 151 a servo controller, 152 a amplifier, 153 a decoder, 153 a decoder, 154 a signal processing circuit, 155 a timing controller or delay circuit, 156 a current sink, 157 a constant or fixed current controller, 158 a output connector, 159 an input connector, 160 a terminal, 161 a signal processing circuit.

The present invention will next be explained in accordance with embodiments which follow.

Shown in FIG. 1 are variations with time in the power level of an energy beam irradiated on a recording medium at the time of recording information on the recording medium. In this embodiment, how to change the power level at the time of recording information with time is referred to generally as write or recording strategy. FIG. 1 shows a recording strategy including an information recording method of the present invention. The present embodiment will be explained in connection with a DVD-RAM as a specific example. In the case of the DVD-RAM, assuming that a reference clock in recording and reproduction modes has a time width Tw, then the shortest mark and/or space has a length of 3 Tw (time length of 3 times as long as the time Tw), and the longest mark and/or space has usually a length of 11 tw and in a special case, of 14 Tw.

When an NRZI signal as information is given to be recorded on the recording medium in a time series manner, a suitable signal processing circuit converts the NRZI signal to a time series variation in the power level of an energy beam, which variation is shown in FIG. 1 as an light pulse waveform. The power level is set to have 4 levels of write level, bias level 1, bias level 2 and bias level 3. At the bias level 1, the state of the recording medium having the energy beam applied thereat can be placed in a first state; while at the write level, the recording medium can be placed in a second state. The bias level 3 is set to be equal to or lower than the bias level 1, when it is desired to form a second state area or zone in the recording medium and the second state area has a length of 4 Tw or more (that is, the NRZI signal has a length of 4 Tw or more), a duration having the power level of the bias level 3 is mixedly placed in the irradiation period of the write level to change the energy beam in a multi-pulsed form. In the multi-pulsed energy beam, the first and last light pulses are referred to as the head or first and tail or last pulses respectively. Between the head and tail pulses, light pulses are repeated between the write level and bias level 3. The repetition frequency, when the NRZI signal has a length of n (n>3), becomes (n−4). The entire repetitive pulses between the head and tail pulses will be generally called a comb-shaped pulse. Accordingly, when it is desired to form a second state area for the NRZI signal having a length of 5 Tw or more, the recording pulse is made up of the head, comb-shaped and tail pulses. When it is desired to form a second state area for the NRZI signal having a length of 4 Tw, the recording pulse is made up of the head and tail pulses. When it is desired to form a second state area for the NRZI signal having a length of 3 Tw, the recording pulse is made up of a single pulse.

A power level equal to or lower than the bias level 1 and equal to or higher than the bias level 3 is set and is referred to as the bias level 2. Following the tail pulse for 4 Tw or more and following the write light pulse for 3 Tw, the power level of the energy beam is held at the bias level 2 for a predetermined time.

There is possibility that the bias level 2 is equal to either one of the bias levels 1 and 3. Or there is possibility that the write level and bias levels 2 and 3 are all exactly at the same power level. There is a case where reference values of the write level and bias levels 1, 2 and 3 are previously recorded at suitable locations on the recording medium as medium information. In this case the locations of the recording medium where the medium information relating to the recording strategy is recorded are referred to as information tracks for a control data zone. The reference values of the power levels are read out from the information tracks of the control data zone on the recording medium to determine each power level in a write mode.

Consider in FIG. 1 a case where it is desired to form a second state area on the recording medium for the NRZI signal having a length of 4 Tw or more and to define a recording waveform. A time elapsed by $T_{EFP}$ from a rising edge of the NRZI signal defines a falling edge of the head pulse in a write pulse train. Further, a rising edge of the head pulse is present at a time earlier by a time $T_{FP}$ from file falling edge of the head pulse. This naturally means that, if the elapsed time from the rising edge of the NRZI signal to the rising edge of the head pulse is defined as $T_{SFP}$, the relationship between $T_{EFP}$, $T_{SFP}$ and $T_{FP}$ becomes $T_{EFP}=T_{SFP}+T_{FP}$.

A rising edge of the tail pulse in the write pulse train is present at a time elapsed by a time $T_{SLP}$ from a reference time earlier by a time 2 Tw than a falling edge time of the NRZI signal. At a time elapsed by a time $T_{ELP}$ from the rising edge time of the tail pulse, there is present a falling edge of the tail pulse. This naturally means that, if the elapsed time from the reference time earlier by a time 2 Tw than a falling edge of NRZI signal to the falling edge of the tail pulse is defined as $T_{ELP}$, the relationship between $T_{SLP}$, $T_{ELP}$ and $T_{LP}$ becomes $T_{ELP}=T_{SLP}+T_{LP}$.

There may sometimes be present a comb-shaped pulse train between the head and tail pulses. Rising edges of pulses in the comb-shaped pulse train coincide with the position of the reference clock. At a time elapsed by the time $T_{MP}$ from the rising edge time of each pulse, the pulse falls.

Consider a case where it is desired to form on the recording medium a second state area corresponding to the NRZI signal of 3 Tw. Assuming that a time elapsed by a time $T_{EFP}$ from a rising edge of the NRZI signal is set as a reference time, then there exists a rising edge in a light pulse at a time earlier by the time $T_{FP}$ from the reference time. This naturally means that, if the elapsed time from the rising edge of the NRZI signal to the rising edge of the light pulse is defined as $T_{SFP}$, the relationship between $T_{EFP}$, $T_{SFP}$ and $T_{FP}$ becomes $T_{EFP}=T_{SFP}+T_{FP}$.

Further, when a time earlier by a time 2 Tw from the falling edge time of the NRZI signal is set as a reference time and a time elapsed by the time $T_{SLP}$ from the reference time is set as a second reference time, the light pulse falls at a time elapsed by a time $T_{LP}$ from the second reference time. This naturally means that, if the elapsed time from the reference time earlier by a time 2 Tw from a falling edge of NRZI signal to a falling edge of the light pulse is defined as $T_{ELP}$, the relationship between $T_{SLP}$, $T_{ELP}$ and $T_{LP}$ becomes $T_{ELP}=T_{SLP}+T_{LP}$.

The last pulse of the NRZI signal of 4 Tw or more or the write pulse of the NRZI signal of 3 Tw is followed by a duration having a power level of the bias level 2 and having a time length of $T_{LC}$.

The reference values of the times $T_{EFP}$, $T_{SFP}$, $T_{FP}$, $T_{ELP}$, $T_{SLP}$, $T_{LP}$, $T_{LC}$ and $T_{MP}$ defining the write pulse are read out from the information track of the control data zone, and these times are determined based on the read-out reference values.

The times $T_{EFP}$, $T_{SFP}$, $T_{FP}$, $T_{ELP}$, $T_{SLP}$, $T_{LP}$, $T_{LC}$ and $T_{MP}$ defining the write pulse are not always limited to having their constant values and sometimes may be required to be changed depending on combinations of the NRZI signals. In particular, in the case of DVD-RAM having a memory capacity of 4.7 GB per one side as an example, the NRZI signal of 3 Tw as the shortest mark has a length of about 0.42 microns that is shorter than a write spot diameter of 0.45 microns. When such high density recording is carried out, thermal interference between adjacent marks becomes great, which, in some cases, makes it difficult to realize the recording always stably. To avoid this, it is considered to change the write waveform to a suitable form according to the combinations of the NRZI signals. In order to correct a shift in the leading edge, any of the times $T_{EFP}$ and $T_{FP}$ is changed. Changes in these times from the reference values thereof are referred to as $\Delta T_{EFP}$ and $T_{TFP}$ respectively.

If $T_{EFP}$ is changed by $\Delta T_{EFP}$ and $T_{FP}$ is not changed, $T_{SFP}$ changes by $\Delta T_{EFP}$. If $T_{FP}$ is changed by $\Delta T_{FP}$ and $T_{EFP}$ is not changed, $T_{SFP}$ changes by $\Delta T_{FP}$. These changes naturally come from the relationship of $T_{EFP}=T_{SFP}+T_{FP}$.

The changes can be described by the followings with completely the same meaning. In case $T_{EFP}$ is changed without changing $T_{FP}$, $T_{SFP}$ is changed by $\Delta T_{SFP}$ without changing $T_{FP}$. Then $T_{EFP}$ is automatically changed by $\Delta T_{SFP}$. In case $T_{FP}$ is changed without changing $T_{EFP}$, $T_{SFP}$ is changed by $\Delta T_{SFP}$ without changing $T_{EFP}$. Then $_{TFP}$ is automatically changed by $-\Delta T_{SFP}$.

The meaning of the two descriptions to correct a shift in the leading edge is completely equivalent. To avoid redundancy, only the first description is used in this embodiment.

The second description is always applicable to the part in this embodiment where the first description is employed.

In order to correct a shift in the trailing edge, any of the times $T_{SLP}$ and $T_{LP}$ is changed. Changes in these times from the reference values thereof are referred to as $\Delta T_{SLP}$ and $\Delta T_{LP}$ respectively.

If $T_{SLP}$ is changed by $\Delta T_{SLP}$ and $T_{LP}$ is not changed, $T_{ELP}$ changes by $\Delta T_{SLP}$. If $T_{LP}$ is changed by $\Delta T_{LP}$ and $T_{SLP}$ is not changed, $T_{ELP}$ changes by $\Delta T_{LP}$. These changes naturally come from the relationship of $T_{ELP}=T_{SLP}+T_{LP}$.

The changes can be described by the followings with completely the same meaning. In case $T_{SLP}$ is changed without changing $T_{LP}$, $T_{ELP}$ is changed by $\Delta T_{ELP}$ without changing $T_{LP}$. Then $T_{SLP}$ is automatically changed by $\Delta T_{ELP}$. In case $T_{LP}$ is changed without changing $T_{SLP}$, $T_{ELP}$ is changed by $\Delta T_{ELP}$ without changing $T_{SLP}$. Then $T_{LP}$ is automatically changed by $\Delta T_{ELP}$.

The meaning of the two descriptions to correct a shift in the trailing edge is completely equivalent. To avoid redundancy, only the first description is used in this embodiment. The second description is always applicable to the part in this embodiment where the first description is employed.

A first lookup table of $T_{MF}$ for the leading edge will be defined. The table is a list of values which are determined by combinations of a length M(n) of a mark being currently written and a length S(n−1) of a space precedent to the mark and which can be positive or negative. Next a second lookup table of $T_{ML}$ for the trailing edge will be defined. This table is a list of values which are determined by combinations of the length M(n) of a mark being currently written and a length S(n+1) of a space subsequent to the mark and which can be positive or negative.

In a case 1, the value of $T_{MF}$ is made equal to the value of $\Delta T_{FP}$ and the value of $T_{ML}$ is also made equal to the value of $\Delta T_{LP}$. In this case, the values of $T_{FP}$ and $T_{LP}$ vary depending on combinations of the NRZI signals. That is, in the head pulse, its rising edge position varies while its falling edge position is stationary. In the tail pulse, on the other hand, its rising edge position is stationary while its falling edge position varies.

If the second description to correct a shift in the leading and the trailing edge is used, the description for case 1 is as follows. The value of $T_{MF}$ is made equal to the value of $T_{SFP}$ without changing the value of $T_{EFP}$. The value of $T_{ML}$ is made equal to the value of $T_{ELP}$ without changing the value of $T_{SLP}$. The meaning of this description is perfectly the same as the first one.

In a case 2, the value of $T_{MF}$ is made equal to the value of $\Delta T_{EFP}$ and the value of $T_{ML}$ is made equal to the value of $\Delta T_{LP}$. In this case, the values of $T_{EFP}$ and $T_{LP}$ vary depending on combinations of the NRZI signals. That is, in the head pulse, its rising and falling edge positions vary at the same time. In the tail pulse, on the other hand, its rising edge position is stationary while its falling edge position varies.

In a case 3, the value of $T_{MF}$ is made equal to the value of $\Delta T_{FP}$ and also the value of $T_{ML}$ is made equal to the value of $\Delta T_{SLP}$. In this case, the values of $T_{FP}$ and $T_{SLP}$ vary depending on combinations of the NRZI signals. That is, in the head pulse, its rising edge position varies while its falling edge position is stationary. In the tail pulse, on the other hand, its rising and falling edge positions vary at the same time.

In a case 4, the value of $T_{MF}$ is made equal to the value of $\Delta T_{EFP}$ and also the value of $T_{ML}$ is made equal to the value of $\Delta T_{SLP}$. In this case, the values of $T_{EFP}$ and $T_{SLP}$ vary depending on combinations of the NRZI signals. That is, in the head pulse, its rising and falling edge positions vary at the same time in the tail pulse, on the other hand, its rising and falling edge positions vary at the same time.

If the second description to correct a shift in the leading and trailing edges is used, the description for case 2 is as follows. The value of $T_{MF}$ is made equal to the value of $T_{SFP}$ without changing the value of $T_{FP}$. The value of $T_{ML}$ is made equal to the value of $T_{ELP}$ without changing $T_{LP}$. The meaning of this description is perfectly the same as the first one.

In a case 5, the value of $T_{MF}$ is made equal to the value of $\Delta T_{FP}$. In this case, the value of $T_{FP}$ varies depending on combinations of the NRZI signals. That is, in the head pulse, its rising edge position varies while its falling edge position is stationary.

In a case 6, the value of $T_{MF}$ is made equal to the value of $\Delta T_{EFP}$. In this case, the value of $T_{EFP}$ varies depending on combinations of the NRZI signals. That is, in the head pulse, its rising and falling edge positions vary at the same time.

In a case 7, the value of $T_{ML}$ is made equal to the value of $\Delta T_{LP}$. In this case the value of $T_{LP}$ varies depending on combinations of the NRZI signals. That is, in the tail pulse, its rising edge position is stationary while its falling edge position varies.

In a case 8, the value of T is made equal to the ML value of $\Delta T_{SLP}$. In this case, the value of $T_{SLP}$ varies depending on combinations of the NRZI signals. That is, in the tail pulse, its rising and falling edge positions vary at the same time.

The values included in the first and second lookup tables and information on selection of any of the cases 1 to 8 are determined by reading information written in the information track of the control data zone on the recording medium.

As has been explained above, since adaptive waveform changes based on the lookup tables are divided into the cases 1 to 8 and any of the cases is selected, the method of the present invention can advantageously cope with recording media having various characteristics and can record information always stably with good compatibility.

In the present embodiment, the first lookup table was defined to have 4×4 cases of 4 sorts of M(n)×4 sorts of S(n−1). The second lookup table was defined to have 4×4 cases of 4 sorts of M(n)×4 sorts of S(n+1). However, the size of the lookup table is not limited to the 4×4 cases but may be set at any cases other than 1×1 to realize the effects of the present invention. Further, although each of the first and second lookup tables forms a two-dimensional table in the present embodiment, it may advantageously be a three-dimensional table based on a combination of three parameters of S(n−1), M(n) and S(n+1) or may be multi-dimensional table. The simplicity and/or complexity of the table may be suitably determined by various factors including characteristics of a recording medium and a demanded recording accuracy. When a DVD-RAM having a memory capacity of 4.7 GB for one side is used as an example, its lookup table is desirably a two dimensional table having a size of about 3×3, 4×3, 3×4 or 4×4.

Now explanation will be made as to mark edge controllability in connection with the cases 1 and 4 as an example. Several experimental results are shown herein. In this connection, their experimental conditions are set so that a linear speed is about 8 m/sec., T is about 17 nsec., a 3 T mark as the shortest mark has a physical length of about 0.4 μm or slightly more, a track pitch is about 0.6 μm, a peak power is 11 mW, the bias power 1 is 4.5 mW, the bias power 2 is 3.5 mW and the bias power 3 is 1 mw.

A single mark having a specific length is recorded always under the same conditions, which is referred to as the anchor mark. Following a space (corresponding to an area having no recorded mark between adjacent recording marks) subsequent to the anchor mark, a mark to be measured (which will be sometimes referred to as the measurement mark) is recorded. A recording pulse for the measurement mark is controlled according to the above case 1 or 4. A reproduction signal obtained by reproducing the anchor mark and measurement mark is digitized into predetermined slice levels to obtain a binary data signal. The binary data signal is used to measure a time interval (leading edge interval) from the leading edge of the anchor mark to the leading edge of the measurement mark. Further, the binary data signal is used to measure a time interval (trailing edge interval) from the trailing edge of the anchor mark to the trailing edge of the measurement mark.

Figure 2A:
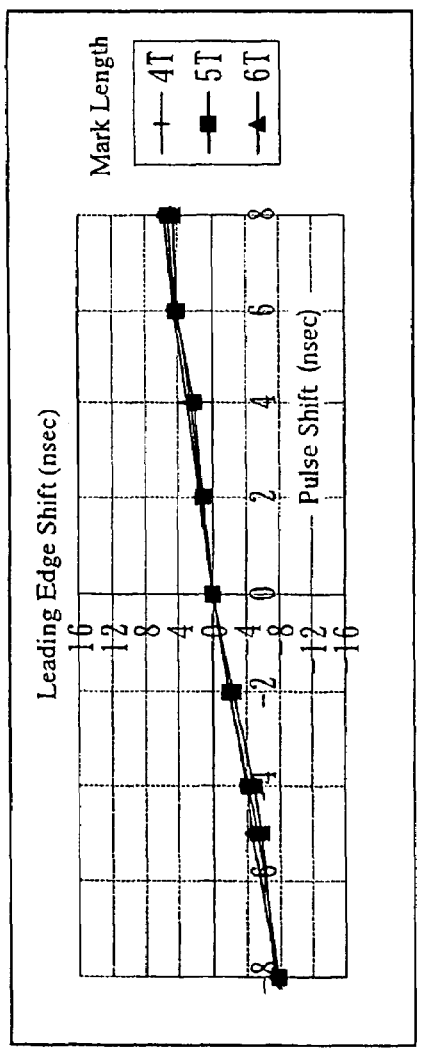
FIGS. 2A and 2B show experimental results in a case 2 in the recording strategy to which the present invention is applied.
Figure 2B:
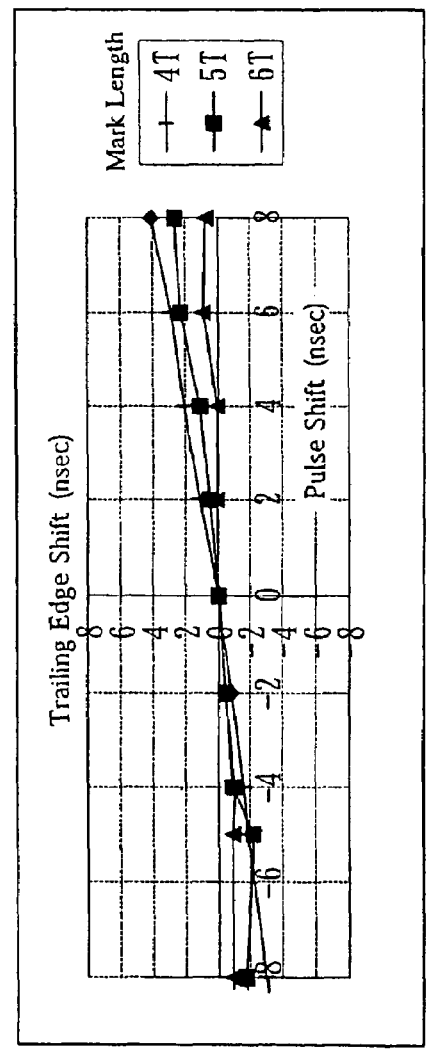

Shown in FIG. 2A are variations in the leading edge interval and shown in FIG. 2B are variation in the trailing edge interval when the tail pulse position is stationary while the head pulse position varies in the case 4. In the drawings, their plus directions of axes are time advancing directions. In the drawings, the lengths of the measurement mark are used as parameters. In FIG. 2A, the head pulse position and mark leading edge position are in a nearly linearly proportional relationship. In FIG. 2B, on the other hand, as the head pulse position moves, the trailing edge correspondingly moves. A movement of the trailing edge amounts even to about 50% of a movement of the head pulse position.

Shown in FIG. 3A are variations in the trailing edge interval and shown in FIG. 3A are variation in the leading edge interval when the head pulse position is stationary while the tail pulse position varies in the case 4.

In the drawings, their plus directions of axes are time advancing directions. In the drawings, the lengths of the measurement mark are used as parameters. In FIG. 3A, the tail pulse position and mark trailing edge position are in a nearly linearly proportional relationship. In FIG. 3B, on the other hand, as the tail pulse position moves, the leading edge correspondingly moves. A movement of the leading edge amounts even to about 50% of a movement of the tail pulse position.

Figure 4A:
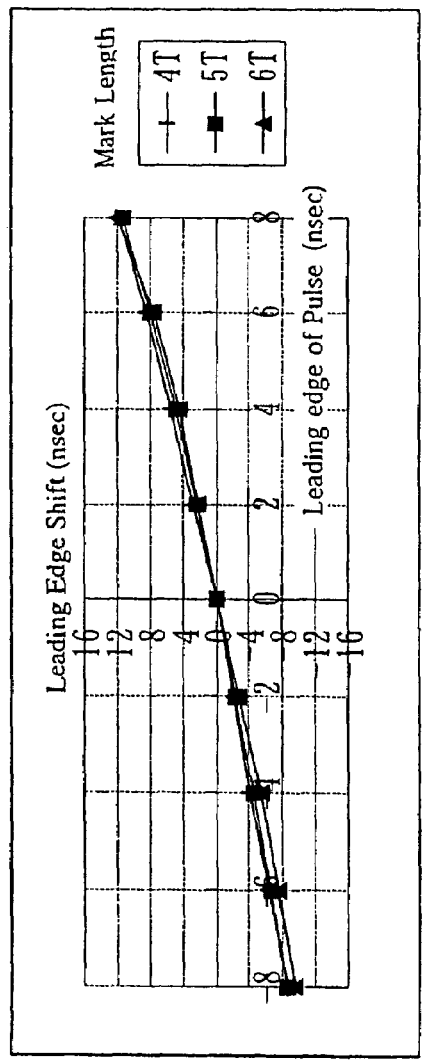
FIGS. 4A and 4B show experimental results in a case 1 in the recording strategy to which the present invention is applied.
Figure 4B:
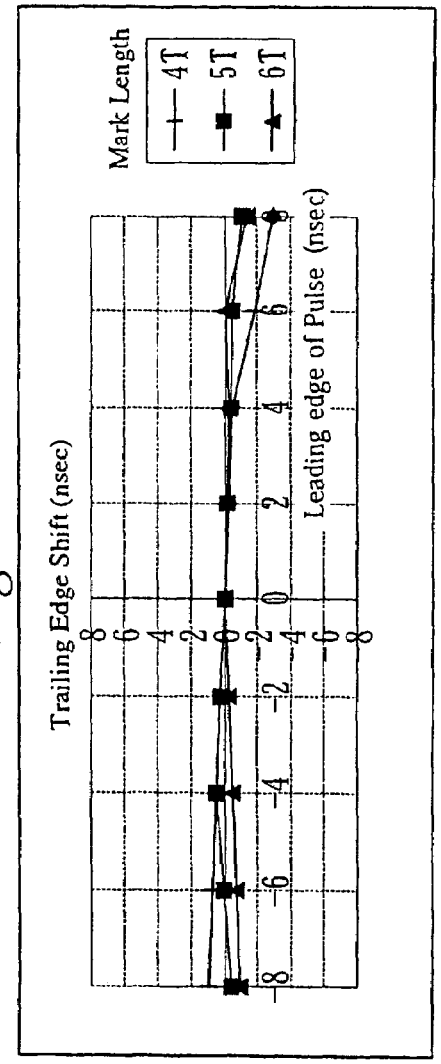

Shown in FIG. 4A are variations in the leading edge interval and shown in FIG. 4B are variations in the trailing edge interval when the tail pulse rising and falling positions are stationary while the head pulse rising position varies in the case 1. In the drawings, their plus directions of axes are time advancing directions. In the drawings, the lengths of the measurement mark are used as parameters. In FIG. 4A, the head pulse rising edge position and mark leading edge position are in a nearly linearly proportional relationship. In FIG. 4B, on the other hand, even when the leading edge position of the head pulse moves, this causes substantially no remarkable movement of the mark trailing edge position at least in a range where the leading edge position of the head pulse less varies.

Figure 5A:
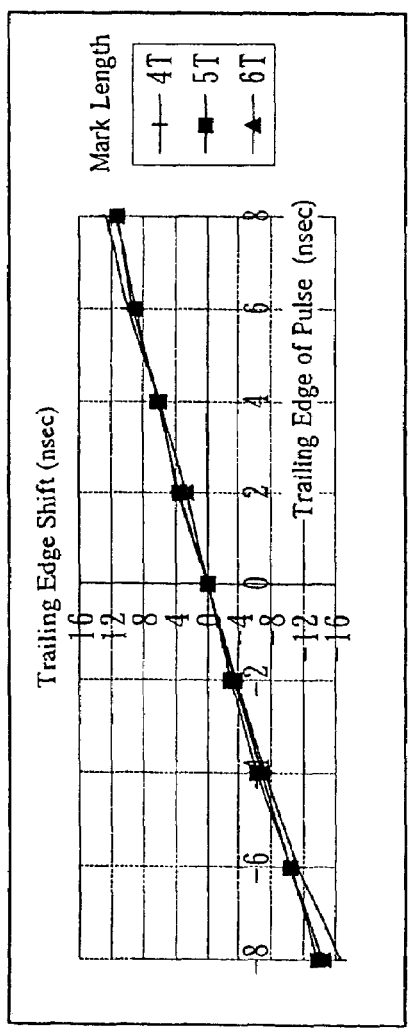
FIGS. 5A and 5B show experimental results in the case 1 in the recording strategy to which the present invention is applied.
Figure 5B:
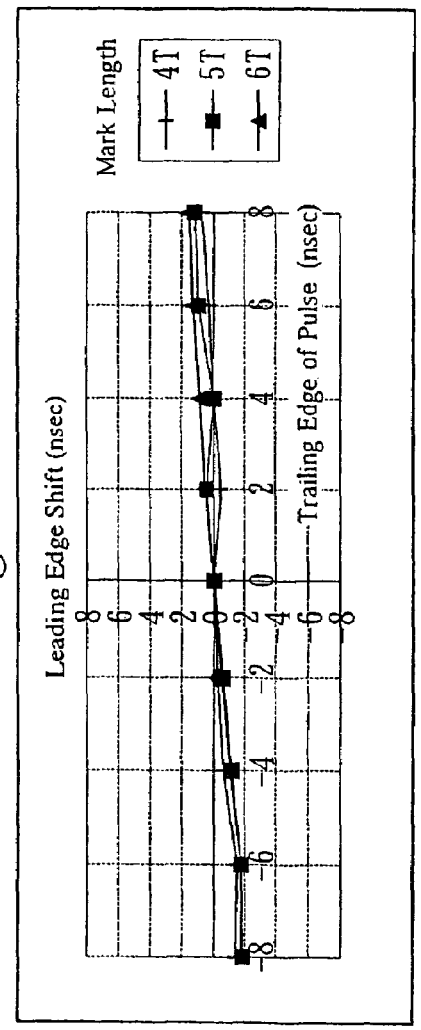

Shown in FIG. 5A are variations in the trailing edge interval and shown in FIG. 5B are variations in the leading edge interval when the rising and falling edge positions of the head pulse are stationary while the falling edge position of the tail pulse varies in the case 1.

In the drawings, their plus directions of axes are time advancing directions. In the drawings, the lengths of the measurement mark are used as parameters. In FIG. 5A, the tail pulse falling edge position and mark trailing edge position are in a nearly linearly proportional relationship. In FIG. 5B, on the other hand, even when the trailing edge position of the tail pulse moves, this causes substantially no remarkable movement of the mark leading edge position at least in a range where the trailing edge position of the tail pulse less varies.

When comparison is carried out between the case 4 of FIGS. 2A, 2B and 3A, 3B and the case 1 of FIGS. 4A, 4B and 5A, 5B, it will be noted from the experimental results shown herein that the case 1 is more preferable with respect to the recording medium and recording strategy used in the experiments. This is because, in the case 1, the leading edge position of the record mark can be controlled independently only by the rising edge position of the head pulse in the recording pulse, and the trailing edge position of the recording medium can be controlled independently only by the falling edge position of the tail pulse in the recording pulse. The case 4 is more deteriorated in the control independency and more difficult in the control than the case 1.

Although the case 1 is more preferable than the case 4 with respect to the recording medium and recording strategy used in the experiments, there is a case where the case 4 is more preferable than the case 1 depending on the design of the recording medium. More specifically, in the case 1, the energy per se possessed by the head or tail pulse is increased or decreased, so that, when the energy of the head or tail pulse is excessively increased, this results in deterioration of overwrite or cross-erase characteristics. In the case 4, on the other hand, since the energy possessed by the entire recording pulse train varies only slightly, there is no likelihood of deterioration of such overwrite or cross-erase characteristics, it goes without saying that, when sufficient margins are given to overwrite or cross-erase characteristics in the design of the recording medium, there can be designed a recording medium without any possibility of deterioration of the overwrite or cross-erase characteristics even in the case.

Figure 6:
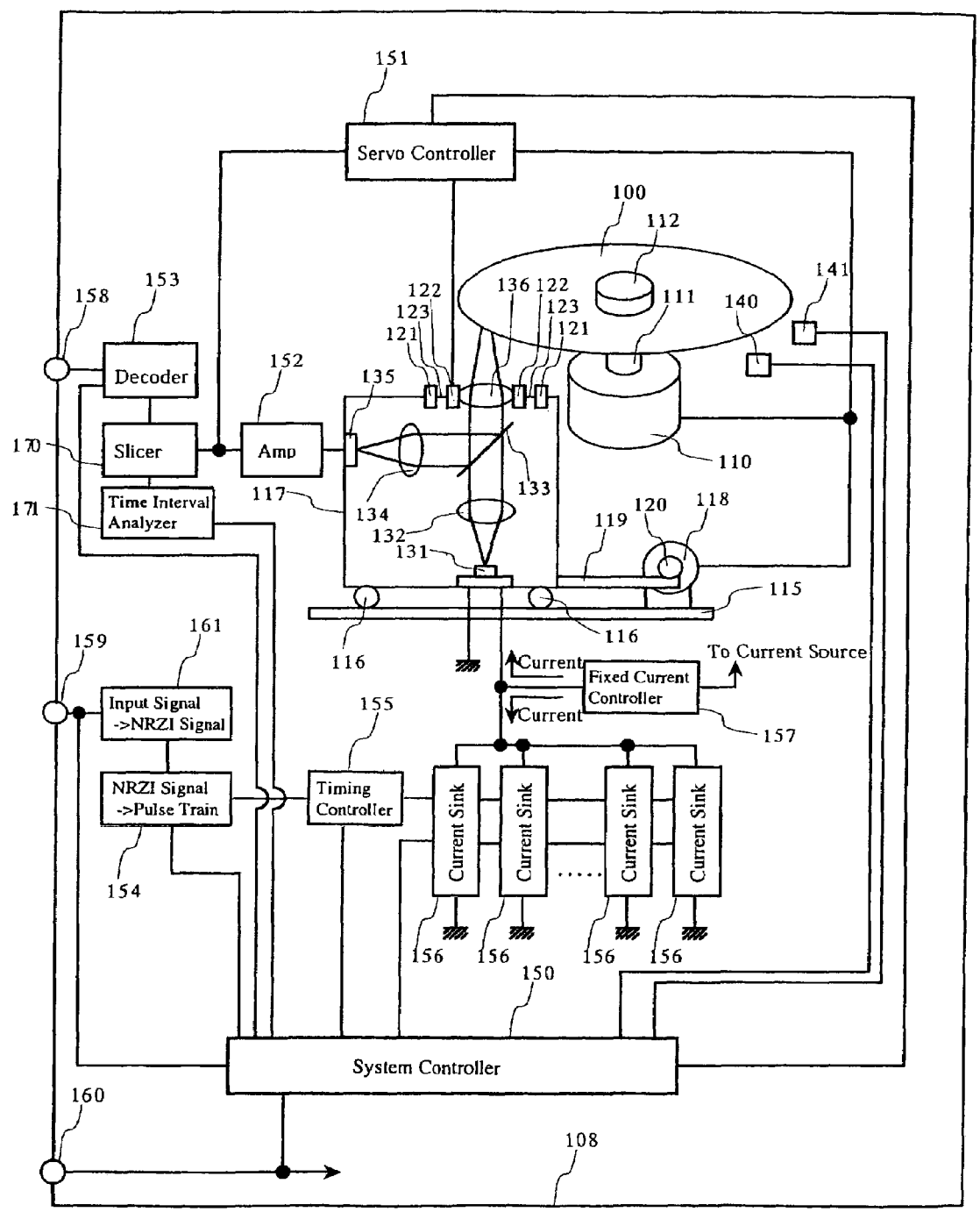
FIG. 6 shows specific examples of an information recording medium and apparatus to which the present invention is applied.

Explanation will then be made as to another embodiment of the present invention with reference to FIG. 6 showing an information storage apparatus in the form of a block diagram. For the convenience of explanation, a recording medium 100 is illustrated as mounted in the information storage apparatus. For the purpose of storing information, the recording medium 100 is indispensable, but it may be dismounted from the information storage apparatus or be mounted thereinto as necessary.

In FIG. 6, a chucking mechanism 112 is mounted to a rotary shaft 111 of a motor 110 attached to a casing 108 so that the chucking mechanism 112 holds a recording medium 100. The chucking mechanism 112 acts to hold the recording medium 100. The motor 110, rotary shaft 111 and chucking mechanism 112 form a mechanism for relatively moving the recording medium 100 and an energy beam.

Mounted to the casing 108 is a rail 115. A rail guide 116 guided by the rail 115 is mounted to a case 117. Also mounted to the case 117 is a linear gear 119, to which a rotary gear 120 is mounted. Transmission of rotation of the rotating motor 118 mounted on the casing 108 to the rotary gear 120 causes linear movement of the case 117 along the rail 115. The linear movement is directed toward nearly the radial direction of the recording medium 100.

Mounted to the case 117 is a magnet 121. Also mounted to the case 117 is an objective lens 130 through a suspension 123 which can be moved only in two directions, that is, in a direction of nearly a normal of the recording surface of the recording medium 100 and in a nearly radial direction of the recording medium 100. Mounted onto the objective lens 130 is a coil 122 as nearly opposed to a magnet 121. When a current flows through the coil 122, its magnetic effect causes the objective lens 130 to be able to move in two directions of the direction of nearly a normal of the recording surface of the recording medium 100 and the nearly radial direction of the recording medium 100. The rail 115, rail guide 116, case 117, magnet 121, suspension 123, coil 122 and objective lens 130 form a mechanism which positions the energy beam at a predetermined position on the recording medium 100.

Mounted to the case 117 is a semiconductor laser 131 as an energy beam generator. The energy beam emitted from the semiconductor laser 131 passes through a collimating lens 132 and a beam splitter 133 and then through the objective lens 130. Part of the light emitted from the objective lens 130 is reflected by the recording medium 100, passed through the objective lens 130, reflected by the beam splitter 133, condensed by a detection lens 134, and then an intensity of the reflected light is then detected by a photodetector 135. More in detail, the photodetector 135 has a plurality of divided light receiving areas. Intensities of light detected on the respective areas are amplified and calculated by an amplifier 152 to detect information (servo signal) indicative of a relative positional relationship between a light spot focused by the objective lens 130 and the recording medium 100 as well as an information read signal. The servo signal is sent from the amplifier to a servo controller 151, whereas the read signal is sent from the amplifier to a decoder 153.

When the recording medium 100 is loaded into the information storage apparatus and the chucking mechanism 112 fixedly holds the recording medium 100, a detector 140 detects the presence of the medium and sends a signal indicative of the medium presence to a system controller 150. The system controller 150, when receiving the signal, controls the motor 110 in such a manner that the recording medium 100 is rotated at a suitable rotational speed. The system controller 150 also controls a rotating motor 118 in such a manner that the case 117 is located at a suitable position. The system controller 150 also causes the semiconductor laser 131 to controllably emit light, an also causes a servo controller 151 to be operated so that the rotating motor 118 is driven or a current flows through the coil 123 to position the light spot focused by the objective lens 130 at a predetermined position on the recording medium 100. The servo controller 151 then sends a signal indicative of the focused spot formed on the recording medium 100 to the system controller 150. The system controller 150, when receiving the signal, sends an instruction to a decoder 153 to decode the read signal therein. When a read track is not an information track in the control data zone, the system controller 150 sends an instruction to the servo controller 151 such that the focused spot is positioned at an information track in the control data zone. As a result of the above operation, the system controller 150 reads the information track of the control data zone and reads out medium information recorded therein.

Written in the information track of the control data zone are such recording strategy parameters as already explained in connection with FIG. 1. That is, the system controller 150 reads out from the recording medium 100 information on the recording power level, time relations between recording pulses, lookup table, and the adaptive control set to any of the cases 1 to 8. The system controller 150 writes these recording strategy parameters in a parameter table of a signal processing circuit 154, a parameter table of a timing controller or delay circuit 155, and a current sink parameter of current sinks 156. The operations of the cases 1 to 8 explained in FIG. 1 can be realized by changing the writing method into the table of the delay circuit 155 depending on the selection of the cases 1 to 8 or by switching switches of a delay circuit 155. Incorporated in the delay circuit 155 are first to fourth timing adjusting means. Also incorporated in the delay circuit 155 is a first change-over mechanism for switching between the first and second timing adjusting means. Further incorporated in the delay circuit 155 is a second change-over mechanism for switching between the third and fourth timing adjusting means.

The timing of the system controller 150 of reading the recording strategy parameters from the recording medium 100 and writing these parameters in the parameter table of the signal processing circuit 154, the parameter table of the delay circuit 155 and the current sink parameter of the current sinks 156 may be set only when the recording medium 100 is put in its writable state. For example, when the recording medium 100 is placed in its write protect state, as when a write protect switch provided on a case of the recording medium 100 is set at its write protect position or as when an upper-level controller of the information storage apparatus issues a write protect command; a series of operations such as the reading of the recording strategy parameters can be omitted. For the purpose of detecting a write protect switch, the detection switch 141 is mounted to the casing 108 and sends its detected signal to the system controller. In the recording protection mode, a preparation time taken after the loading of the recording medium 100 in the chucking mechanism 112 until the medium reaches its reproducible state can be shortened by stopping the reading of the recording strategy parameters.

When receiving an information reproduction command from the upper-level controller through the input connector 159, the system controller 150 issues a command to the servo controller 151 to position the focused spot at a suitable position on the recording medium 100, a signal obtained from the photodetector 135 is decoded by the decoder 153 to obtain read information, and then the read information is sent from the decoder 153 through an output connector 158 to the upper-level controller.

When receiving an information write command and write information (to be written) from the upper-level controller via an input connector 159, the system controller 150 issues a command to the servo controller 151 to position the focused spot at a suitable position on the recording medium 100. Further, the write information is converted by the signal processing circuit 161 to an NRZI signal. The converted NRZI signal is converted by the signal processing circuit 154 to a suitable train of a plurality of pulses. The pulse train is passed through the delay circuit 155 and transmitted to the current sinks 156. In the illustrated example, the signal processing circuit 154 and signal processing circuit 161 form a signal processing circuit which converts the write signal to the recording pulse trains.

A fixed current controller 157 is connected to the semiconductor laser 131 so that a total of currents consumed by the semiconductor laser 131 and current sinks 156 has always a constant value. The plurality of current sinks 156 are connected to the fixed current controller 157. Whether or not the current sinks 156 are operated to absorb the current depends on the signal generated by the signal processing circuit 154 and passed through the delay circuit 155. When the current sinks 156 are operated, a part of the current issued from the fixed current controller 157 is absorbed by the current sinks 156, resulting in reduction of a current flowing into the semiconductor laser 131. This causes the energy level of the energy beam emitted from the semiconductor laser 131 to be varied. The signal processing circuit 154 and delay circuit 155 realize such a recording strategy as shown in FIG. 1 when the plurality of current sinks 156 are operated with suitable timing.

For the above operation, power is externally supplied to the information storage apparatus via a terminal 160.

As has been explained in the foregoing, recording is carried out as modified according to the cases 1 to 8, so that, even when such high-density recording is carried out as the shortest mark length is the recording spot radius or less, the information recording can advantageously be carried out independently of the characteristics of the recording medium and with good compatibility and good stability. Further, since the present invention uses such a recording medium as to be able to record information about selection of any of the cases 1 to 8 in the information track of the control data zone on the recording medium, there is provided a recording medium which can record information with a high density independently of fluctuations in recording characteristics of the information storage apparatus always with good stability and compatibility.

Further, since the information about selection of any of the cases 1 to 8 is read out from the recording medium 100 and is used to reflect it on the state of the information storage apparatus, there are provided a recording method and an information storage apparatus which can record information always with good stability, and compatibility and with a high density.

In accordance with the foregoing embodiments, even when such high-density recording is carried out as the shortest recording mark length is the recording spot radium or less, information can be recorded on a recording medium independently of characteristics of the recording medium or on characteristics of the information storage apparatus, always with good compatibility and stability.

What is claimed is:

1. An information recording apparatus using an optical recording medium comprising:
   a light source to irradiate a light beam to the optical recording medium; and
   means for forming a plurality of recording pulses of the light beam including information to be recorded;
   wherein a leading edge of a first recording pulse of the plurality of recording pulses shifts at a shifting value; and
   wherein the shifting value of the leading edge of the first recording pulse of the plurality of recording pulses is determined by a combination of a length of $M(n)$ of a mark within one of the plurality of recording pulses being currently written and a length $S(n-1)$ of a space precedent to the mark.

2. An information recording apparatus according to claim 1, wherein the shifting value has been stored in advance within the optical recording medium in a lookup table storing information on the shifting value.

* * * * *